United States Patent Office 3,720,476
Patented Mar. 13, 1973

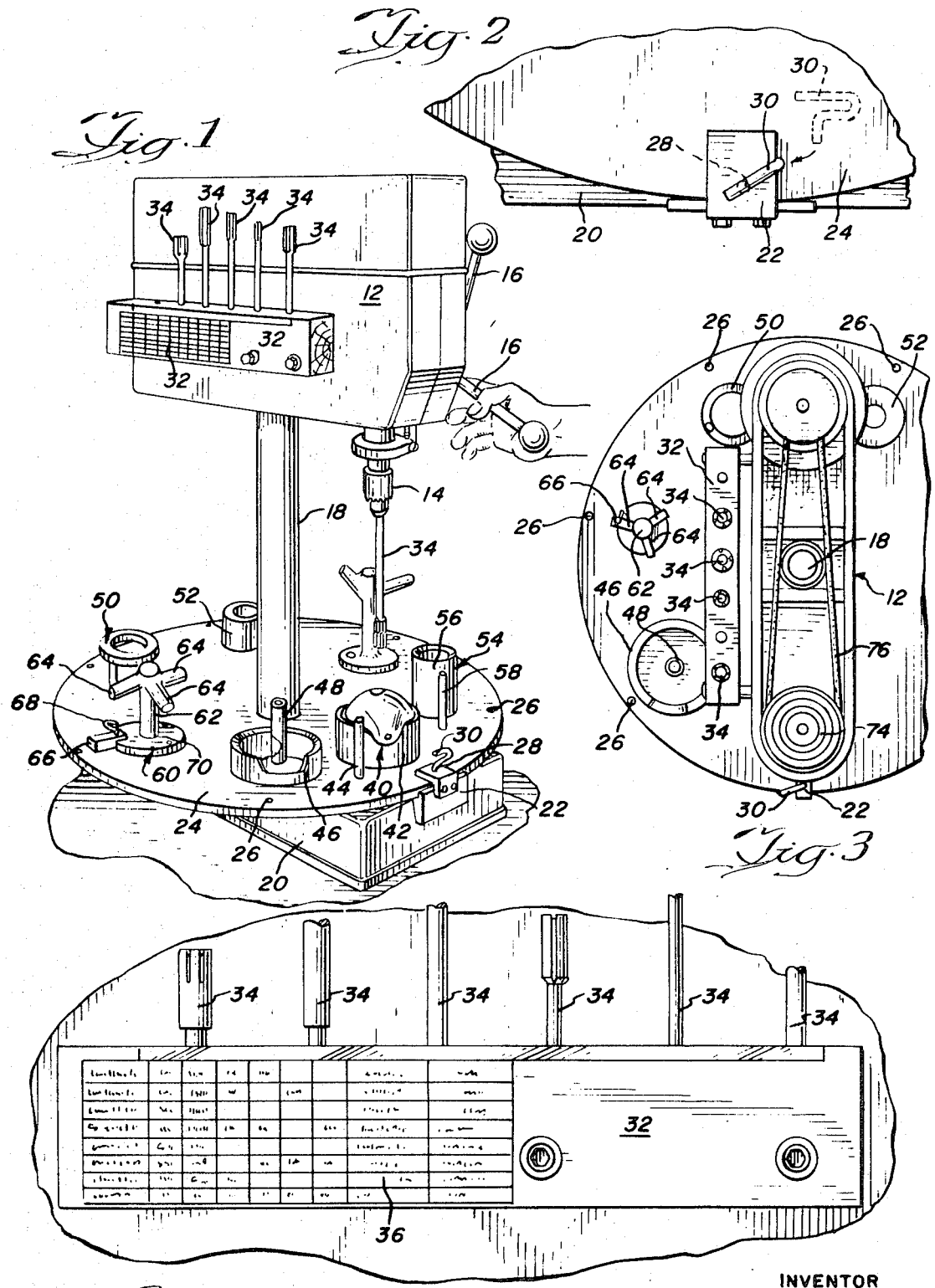

3,720,476
REAMING APPARATUS
Clifford A. Taylor, 8315 S. Lockwood Ave.,
Oak Lawn, Ill. 60607
Filed Oct. 19, 1970, Ser. No. 81,836
Int. Cl. B23b 39/20
U.S. Cl. 408—71                            1 Claim

ABSTRACT OF THE DISCLOSURE

A reaming apparatus is provided in which a circular rotatable turret member underlies a body member carrying an adjustable chuck for holding a reamer. The turret member carries a number of fixtures each of which is adapted for holding a workpiece to be reamed.

BACKGROUND OF THE INVENTION

This invention concerns a reaming apparatus, and more particularly, an apparatus for holding in place various diesel starter motors for reaming a new bushing during rebuilding of the motor.

Diesel starter motors generally utilize metal bushings which may be replaced during rebuilding of the motor. The replaced bushings typically have an inside diameter that is slightly smaller than the diameter of the shaft and it is necessary to ream such bushings in order to obtain an appropriate fit between the shaft and bushing. If the motor housing carrying the new bushing is not truly aligned with the reamer, the bushing will not be reamed true along its entire length.

There are many different types of motor housings that have bushings which require reaming, and centering prior art reaming apparatus to true alignment with the bushings has been found difficult and time consuming. In addition to the reaming of new bushings which have been press fitted to place, on occasion the oil holes in the motor housings are blocked off by these new bushings. It is, therefore, desirable to drill and make operative the oil holes in order to extend the life of the rebuilt motor.

It is an object of the present invention to provide reaming apparatus which enables various motor housings to be properly located for true alignment of the reamer with the bushing carried by the housing.

Another object of the present invention is to provide in a reaming apparatus, a turret member which carries a number of fixtures for holding workpieces being reamed, and which turret member is movable with respect to an adjustable chuck for holding a reamer.

A further object of the present invention is to provide a reaming apparatus having a rotatable turret member which carries a number of fixtures for holding a workpiece to be reamed, wherein one of the fitxures comprises a generally cylindrical mounting adapted for receiving a motor end frame having a central bore and another of the fixtures comprises a rotatably mounted upright extending from the turret member and having horizontal arms extending therefrom and being adapted for insertion in the bore of the center housing of a motor, to enable true reaming of an oil hole.

A still further object of the present invention is to provide a reaming apparatus which is simple to manufacture and provides a highly efficient reaming operation for diversified motor housings.

Other objects and advantages of the present invention will become apparent from the following description, claim, and the accompanying drawing.

BRIEF DESCRIPTION OF THE DRAWING

FIG. 1 is a perspective view of a reaming apparatus constructed in accordance with the principles of the present invention;

FIG. 2 is a fragmentary top-plan view of a portion of the turret member of the apparatus of FIG. 1;

FIG. 3 is a fragmentary top plan view of the apparatus of FIG. 1, with the top of the body member removed for illustrative purposes; and FIG. 4 is a fragmentary elevational view of the reamer-carrying fixture of the apparatus of FIG. 1.

DETAILED DESCRIPTION OF THE ILLUSTRATIVE EMBODIMENT

Referring to FIG. 1, the reaming apparatus 10 shown therein comprises a body member 12 carrying a conventional vertically extending adjustable chuck 14 and also having radially extending handles 16 for moving the chuck vertically with respect to body member 12. The body member 12 is supported by a vertical upright 18 which is fastened to a base 20 having a locking member 22 fastened thereto.

A circular disc-shaped turret member 24, lying in a horizontal plane, is positioned about the vertical upright 18, directly above base 20 and is rotatable with respect to the upright. The turret member defines a number of apertures 26 which are spaced from the axis of upright 18 the same distance as the spacing distance of aperture 28, defined by locking member 22, from the axis of vertical upright 18. In this manner, apertures 26 can be aligned with aperture 28 of lock member 22 and pin 30 can be set in place within aperture 28 and aligned aperture 26 to lock the turret in place with respect to base member 20.

A holder 32 is fastened to body member 12 for holding a number of different sized reamers 34, each of which is adapted for placement within adjustable chuck 14, as illustrated in FIG. 1. Holder 32 has a chart 36 positioned thereon for indicating which reamer 34 and which workpiece fixture should be used with various motor housings.

As shown in FIGS. 1 and 2, turret member 24 carries a number of workpiece fixtures on its top surface, each of which is suitable for holding a different type of motor housing or frame. For example, fixture 40 comprising a cylindrical member 42 and adjacent post 44 may be used to hold the drive end and the center housing of a diesel starter in place during reaming of the new bushing. Post 44 aids in preventing rotation of the starter component during reaming thereof, as indicated in FIG. 1. Fixture 46 is used to hold a particular starter drive end and post 48 is used for holding small pinch-back starters. Fixture 50 is used to hold the commutator end frame of a starter during reaming and fixture 52 is used to hold the center housing of certain diesel starters. Fixture 54 is used to hold the center housings of various diesel starters which are different in size from the components used with fixture 40. As seen in FIG. 1, fixture 54 includes a cylindrical member 56 and an adjacent post 58 for preventing rotation of the component during reaming, both of which parts of fixture 54 extend upwardly from the top surface of turret member 24.

In certain circumstances when a new bushing is inserted, the oil hole which carries an oil wick is blocked off, thereby preventing proper lubrication of the motor. In order to drill such oil holes, a fixture 60 is provided comprising a rotatable post 62 having arms 64 extending outwardly therefrom. The axis of post 62 is located inwardly of the axis of the reaming tool when the fixture 60 is in position below the reaming tool so that the center of the reamer is aligned with one of the arms 64. Each of the arms is a different size and is adapted for insertion into the shaft opening of a motor housing so that the oil hole which generally extends perpendicular to the shaft opening can be drilled. In order to prevent post 60 from rotating during the reaming operation, a lock 66, which is similarly operable to lock 22, is provided whereby a lock pin 68 can be inserted into an aperture defined by lock 56 which is aligned with an aperture defined by rotatable member 70 fastened to post 62 for rotation therewith.

Referring to FIG. 3, chuck 14 is fastened to a shaft which is connected to pulley 74. Pulley 74 is driven by belt 76 which is rotated by a pulley fastened to the shaft of a motor which is actuated when reaming is desired. It can be easily seen that when the bushing of a predetermined component is to be reamed, a fixture is selected for holding the component and is set in place by rotating turret member 22 and locking the turret member by means of pin 30. The appropriate reaming tool is connected to the chuck and the component to be reamed is placed on the selected fixture and set in place so that rotation is prevented during reaming. The motor driving the chuck is actuated and the chuck is then moved downwardly by rotating one of handles 16.

Fixtures 40, 46, 50, 52 and 54 are positioned so that their central axes are coaxial with the axis of the reaming tool when the fixtures are in place beneath the reaming tool, with the respective apertures 26 aligned with aperture 28 of locking member 22. In this manner, true alignment of the reamer with the bushing to be reamed is accomplished and the turret member provides the selectivity necessary to enable the apparatus to be used with a large number of diversified housing components.

Although an illustrative embodiment of the invention has been shown and described, it is to be understood that various substitutions and modifications may be made by those skilled in the art without departing from the spirit and scope of the present invention.

I claim:

1. In a reaming apparatus having a motor-driven adjustable chuck for holding a reamer, the improvement comprising, in combination: a body member carrying the chuck and means for rotating the chuck, a vertical upright supporting the body member with the opening of the chuck facing downwardly, manually operable means for moving the chuck vertically, a turret member carrying a plurality of fixtures adapted for holding workpieces being reamed, means for enabling rotation of the turret member with respect to the chuck in a horizontal plane, said turret member and fixtures being located below the body member with the chuck and fixtures equally spaced from the upright whereby upon relative rotation of the turret member with respect to the chuck a selected fixture can be positioned to directly underlie the chuck, and means cooperative with at least one of said fixtures for preventing the workpiece from rotating during reaming thereof, with one of said fixtures comprising a rotatably mounted upright extending from the turret member and having horizontal arms extending therefrom, each of the horizontal arms being adapted for insertion in the bore of the center housing of a motor to enable drilling of an oil hole of the motor, and means for preventing rotation of said rotatably mounted upright during drilling of the oil hole.

References Cited

UNITED STATES PATENTS

| | | | |
|---|---|---|---|
| 2,070,463 | 2/1937 | Allemann | 408—90 |
| 2,829,470 | 4/1958 | Johnson | 408—87 |
| 361,105 | 4/1887 | Winchell | 408—90 |
| 2,509,056 | 5/1950 | Gartner | 144—154 |
| 2,791,136 | 5/1957 | Smith | 408—91 |
| 2,860,532 | 11/1958 | Zickafoose | 408—91 |

FOREIGN PATENTS

| | | | |
|---|---|---|---|
| 564,281 | 12/1923 | France | 408—91 |
| 674,352 | 1/1930 | France | 408—91 |
| 715,831 | 1/1942 | Germany | 408—91 |

GERALD A. DOST, Primary Examiner